US008767908B2

(12) United States Patent
Leahy et al.

(10) Patent No.: US 8,767,908 B2
(45) Date of Patent: Jul. 1, 2014

(54) EXACT AND APPROXIMATE REBINNING OF TIME-OF-FLIGHT PET POSITRON EMISSION TOMOGRAPHY DATA

(75) Inventors: Richard Leahy, El Segundo, CA (US);
Sanghee Cho, Newton, MA (US);
Sangtae Ahn, Los Angeles, CA (US);
Quanzheng Li, Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 1163 days.

(21) Appl. No.: 12/603,031

(22) Filed: Oct. 21, 2009

(65) Prior Publication Data
US 2010/0098312 A1    Apr. 22, 2010

Related U.S. Application Data

(60) Provisional application No. 61/107,229, filed on Oct. 21, 2008, provisional application No. 61/107,233, filed on Oct. 21, 2008.

(51) Int. Cl.
*G01T 1/166* (2006.01)
*G01T 1/29* (2006.01)
(52) U.S. Cl.
CPC .................................. *G01T 1/2985* (2013.01)
USPC ............................. 378/4; 378/21; 250/363.04
(58) Field of Classification Search
CPC ....... G01T 1/2985; G06T 11/00; G06T 15/00; G06T 2211/40
USPC .......................... 250/363.02–363.04; 382/131; 378/4–27, 62
See application file for complete search history.

(56) References Cited

U.S. PATENT DOCUMENTS

| 6,115,446 A | 9/2000 | Pan |
| 6,410,920 B1 | 6/2002 | Shao et al. |
| 6,462,342 B1 | 10/2002 | Stearns |

(Continued)

FOREIGN PATENT DOCUMENTS

| WO | 2006109203 A1 | 10/2006 |
| WO | WO 2007020543 | 2/2007 |

OTHER PUBLICATIONS

Cho et al., Iterative Image Reconstruction Using Inverse Fourier Rebinning for Fully 3-D PET, IEEE Transaction on Medical Imaging, vol. 26, No. 5, May 2007, pp. 745-756.*

(Continued)

*Primary Examiner* — Thomas R Artman
(74) *Attorney, Agent, or Firm* — McDermott Will & Emery LLP

(57) ABSTRACT

A technique for processing of data from time-of-flight (TOF) PET scanners. The size of TOF PET data may be reduced without significant loss of information through a process called rebinning. The rebinning may use the Fourier transform properties of the measured PET data, taken with respect to the time-of-flight variable, to perform data reduction. Through this rebinning process, TOF PET data may be converted to any of the following reduced representations: 2D TOF PET data, 3D non-TOF PET data, and 2D non-TOF PET data. Mappings may be exact or approximate. Approximate mappings may not require a Fourier transform in the axial direction which may have advantages when used with PET scanners of limited axial extent. Once TOF PET data is reduced in size using this rebinning, PET images may be reconstructed with hardware and/or software that is substantially less complex and that may run substantially faster in comparison to reconstruction from the original non-rebinned data.

10 Claims, 2 Drawing Sheets

(56) References Cited

U.S. PATENT DOCUMENTS

| | | | |
|---|---|---|---|
| 6,490,476 | B1 | 12/2002 | Townsend et al. |
| 6,631,284 | B2 | 10/2003 | Nutt et al. |
| 6,674,083 | B2 | 1/2004 | Tanaka et al. |
| 6,915,004 | B2 | 7/2005 | Newport et al. |
| 7,015,477 | B2 | 3/2006 | Gunter |
| 7,039,227 | B2 | 5/2006 | Tanaka et al. |
| 7,057,178 | B1 | 6/2006 | Manjeshwar et al. |
| 7,227,149 | B2 | 6/2007 | Stearns et al. |
| 7,251,307 | B2 | 7/2007 | Chen |
| 7,381,959 | B2 * | 6/2008 | Manjeshwar et al. ... 250/363.03 |
| 7,417,231 | B2 * | 8/2008 | Defrise et al. ........... 250/363.04 |
| 7,444,011 | B2 | 10/2008 | Pan et al. |
| 7,447,345 | B2 | 11/2008 | Shanmugam et al. |
| 7,489,799 | B2 | 2/2009 | Nilsen et al. |
| 7,638,771 | B2 * | 12/2009 | Breeding et al. ......... 250/363.04 |
| 7,848,559 | B2 * | 12/2010 | Defrise et al. ................ 382/132 |
| 8,000,513 | B2 * | 8/2011 | Defrise et al. ................ 382/132 |
| 8,073,109 | B2 * | 12/2011 | Gagnon et al. ............... 378/131 |
| 8,265,365 | B2 * | 9/2012 | Panin ........................... 382/128 |
| 2003/0161521 | A1 | 8/2003 | Newport et al. |
| 2006/0102846 | A1 * | 5/2006 | Manjeshwar et al. ... 250/363.03 |
| 2006/0266946 | A1 * | 11/2006 | Defrise et al. ........... 250/363.03 |
| 2007/0201611 | A1 | 8/2007 | Pratx et al. |
| 2008/0099686 | A1 | 5/2008 | Defrise et al. |
| 2009/0072155 | A1 | 3/2009 | Watson et al. |
| 2009/0124900 | A1 * | 5/2009 | Vandenberghe ............... 600/436 |
| 2010/0074500 | A1 * | 3/2010 | Defrise et al. ................ 382/131 |

OTHER PUBLICATIONS

Xuan et al., Exact rebinning methods for 3D PET, IEEE, 1999, pp. 1604-1609.*

Cho et al., Exact and Approximate Fourier rebinning of PET data from Time-of-Flight to non Time-of-Flight, Phys Med Biol, 54, 2009, pp. 467-484.*

PCT Application No. PCT/US2009/061531, "The International Search Report and the Written Opinion of the International Searching Authority," mailed May 20, 2010.

Defrise, M. et al. Exact and Approximate Rebinning Algorithms for 3-D PET Data. IEEE Transactions on Medical Imaging, vol. 16, No. 2, Apr. 1997, pp. 145-158.

Defrise, M. et al. Fourier Rebinning of Time-of-Flight PET Data. Phys. Med. Biol., vol. 50, (2005), pp. 2749-2763.

Defrise. M. et al. Continuous and Discrete Data Rebinning in Time-of-Flight PET. IEEE Transactions on Medical Imaging, vol. 27, No. 9, Sep. 2008, pp. 1310-1322.

Kao, C-M et al. An Exact Fourier Rebinning Algorithm for 3D PET Imaging Using Panel Detectors. Phys. Med. Biol. 49 (2004), pp. 2407-2423.

Liu, X. et al. Exact Rebinning Methods for Three-Dimensional PET. IEEE Transactions on Medical Imaging, vol. 18, No. 8, Aug. 1999, pp. 657-664.

Mullani, N. et al. Sensitivity Improvement of TOFPET by the Utilization of the Inter-Slice Coincidences. IEEE Transactions on Nuclear Science, vol. Ns-29, No. 1, Feb. 1982, pp. 479-483.

* cited by examiner

EXACT AND APPROXIMATE REBINNING OF TIME-OF-FLIGHT PET POSITRON EMISSION TOMOGRAPHY DATA

CROSS-REFERENCE TO RELATED APPLICATION(S)

This application is based upon and claims priority to U.S. Provisional Patent Application No. 61/107,229 entitled "Fourier Rebinning Of Time Of Flight Positron Emission Tomography Data" filed on Oct. 21, 2008, and U.S. Provisional Patent Application No. 61/107,233 entitled "Exact And Approximate Rebinning From Time Of Flight To Non-Time Of Flight Of Positron Emission Tomography" filed on Oct. 21, 2008.

STATEMENT REGARDING FEDERALLY SPONSORED RESEARCH

This invention was made with Government support under contract number R01 EEB00363 awarded by the National Institute of Biomedical Imaging and BioEngineering of the National Institute of Health. The Government has certain rights in the invention.

BACKGROUND

1. Technical Field

This disclosure relates to medical imaging, including positron emission tomography (PET) scanners which produce and process time-of-flight (TOF) information.

2. Description of Related Art

PET scanners may be used for both biomedical and neuroscientific research and clinical studies for diagnosing and staging disease and for assessing response to therapy.

PET scans may be taken to produce 3D images of various biological processes and functions within a living body. A patient may by injected with a radiotracer. The radiotracer may include biochemical molecules that participate in the physiological process. The biochemical molecules may be tagged with a positron emitting radioisotope. These radioisotopes may naturally decay inside the body, ejecting positron particles from their nuclei.

Each emitted positron may quickly combine with an electron, which may then annihilate one another. The annihilation event may produce a pair of gamma photons traveling in opposite directions. The gamma photons may be detected by two detectors in an array of detectors positioned around the patient.

The simultaneous detection of a gamma photon by two different detectors in the array may be indicative of a single annihilation event. The annihilation may be assumed to have taken place at some point on the line between the two detectors which have simultaneously detected the gamma photons. This connecting line is commonly referred to as a "line of response" (LOR).

Several annihilation events may take place on the same LOR. The number of detected annihilation events on each possible LOR may be counted and stored, along with information identifying the spatial coordinates of the LOR. This collective set of data is commonly referred to as a sinogram.

The detector array may be a single ring of detectors, commonly referred to as a 2D detector array, such as is illustrated in FIG. 1 (taken from U.S. Pat. No. 7,381,959). The detector may instead include several rings of detectors stacked in a cylinder, commonly referred to as a 3D detector array, such as is illustrated in FIG. 2. (also taken from U.S. Pat. No. 7,381,959).

A 2D detector array may only detect annihilation events which produce an LOR which is perpendicular to the axis of the array, such as LORs 101 and 103 in FIG. 1. A 3D detector array, such as the one shown in FIG. 2, on the other hand, may also detect annihilation events which produce LORs which are not perpendicular to the axis of the array, such as LOR 201.

A 3D image showing the location of tagged biochemical molecules within a body may be reconstructed from the sinogram data. This may be accomplished by transforming the LOR data into a 3D image of the annihilation events using complex mathematical computations. This transformation process is known as image reconstruction. Image reconstruction may be based on Fourier transform relationships between the 3D image and the sinogram data. Image reconstruction may instead be based on physical and statistical models of the photon pair detection process that use computational numerical optimization methods to produce the best possible image based on these models.

Most annihilation events may not produce LORs which are perpendicular to the axis of the detector array. Thus, 2D detector arrays produce far less data than 3D detector arrays. This smaller data set may be easier to process, but may result in poorer quality 3D images. The 3D data sets may be able to produce better image quality through increased efficiency in detecting annihilation events leading to an improved signal-to-noise ratio in the sinogram data.

Much of the additional image clarity provided by 3D PET scan data may be preserved, without performing intensive data computations during the reconstruction process, by first converting the 3D PET scan data into 2D PET scan data before the 3D image is reconstructed. This has been done by taking the Fourier transform with respect to the spatial coordinates of the LORs in the 3D PET scan data in a process known as "Fourier rebinning" See Defrise M., Kinahan P. E., Townsend D. W., Michel C., Sibomana M., and Newport D. F. (1997), "*Exact and Approximate Rebinning Algorithms for 3-D PET data*," IEEE Trans. Med. Imaging, vol. 16, pp. 145-158 and Liu X., Defrise M., Michel C., Sibomana M., Comtat C., Kinahan P., and Townsend D. (1999), "*Exact Rebinning Methods for Three-Dimensional PET,*" IEEE Trans. Med. Imaging, vol. 18, pp. 657-664.

The quality of reconstructed 3D images may be further enhanced by detecting and storing the difference in time between the arrivals of each pair of gamma photons from each annihilation event. This is commonly referred to as "time of flight" (TOF) information. A TOF of zero, for example, indicates that the annihilation event took place at approximately the midpoint of the LOR. A positive or negative TOF, on the other hand, indicates that the annihilation event took place to the left or right of this midpoint.

Fully 3D time-of-flight (TOF) PET scanners may offer the potential for previously unachievable signal-to-noise ratio in clinical PET. Recent developments of fast scintillators such as LSO and LaBr3 make clinical TOF PET practical. However, fully 3D TOF PET image reconstruction using accurate system and noise models may be challenging due to the huge data size.

Efforts have been made to reduce data size without losing information, a process commonly referred to as "rebinning."

One approach to rebinning of TOF data is single slice rebinning (SSRB-TOF). See Mullani N., Wong W., Hartz R., Philippe E., and Yerian K. (1982) "*Sensitivity Improvement of TOF PET by the Utilization of the Inter-Slice Coincidence,*"

IEEE Trans. Nucl. Sci., vol. 29, pp. 479-483. Oblique TOF sinograms are combined to form a set of stacked 2D TOF sinograms in a similar manner to single slice rebinning for non TOF data. This method may reduce achievable image resolution through the rebinning procedure.

As an alternative to SSRB-TOF is an approximate Fourier rebinning method in which the rebinning is performed in the Fourier domain See U.S. Pat. No. 7.417,231 B2 US Patent; Defrise M., Casey M. E., Michel C., and Conti M. (2005), "*Fourier Rebinning of Time-of-Flight PET Data*," Phys. Med. Biol., vol. 50, pp. 2749-2763. This approximate approach may show improved performance over SSRB-TOF by making use of the Fourier transform properties of the TOF sinograms. The data is rebinned from 3D TOF to stacked 2D TOF sinograms.

An exact rebinning equation was derived based on a consistency condition expressed by a partial differential equation in the continuous data domain. See Defrise M., Panin V., Michel C., and Casey M. E. (2008), "*Continuous and Discrete Data Rebinning in Time-of-Flight PET*," IEEE Trans. Med. Imaging, vol. 27, pp. 1310-1322; U.S. PGPub 2008/0099686, where rebinning is performed with respect to the axial variables. This result motivated the development of an approximate discrete axial rebinning method. In this method, a cost function based on a bias and variance tradeoff is used to find optimal pre-computable rebinning coefficients. Using these coefficients, a weighted average of the axial lines of response is taken to estimate an appropriate line of response in a 2D direct plane. The exact mappings that rebin 3D TOF data to 2D TOF data require calculation of partial derivatives which are numerically unstable and may lead to poor results when used with noisy data. Both the exact and approximate rebinning methods are again restricted to rebinning to stacked 2D TOF data.

All the rebinning methods described above rebin 3D TOF data to 2D TOF data and retain the TOF component in the rebinned data. As a result, the reconstruction methods and computer programs that are used to compute the 3D PET images must work directly with the TOF data.

SUMMARY

3D TOF PET data may be highly redundant and may be reconfigured using a process called rebinning to reduce the size or dimensionality of this data prior to reconstruction of the 3D PET image. The Fourier transform of the 3D TOF PET data with respect to variables that include the time-of-flight (TOF) variable may be used as the basis for performing this rebinning process to reduce the data size. TOF data may be rebinned into equivalent PET data without TOF information (non-TOF data), while retaining the signal-to-noise ratio advantage of the TOF data. This in turn may lead to improved reconstructed image quality compared to that which might be reconstructed from data collected from a non-TOF scanner. The rebinning process may lead to reconstructed images of similar quality as those reconstructed directly from the complete TOF data, but the computer power or computation time required for reconstruction from the rebinned data may be significantly lower than that for reconstruction from the complete TOF data. TOF data may be rebinned using both exact and approximate methods. The approximate methods may allow rebinning of 3D TOF data to 2D TOF, 2D non TOF, and 3D non TOF data, in a manner that is practical for use with data collected from commercially available TOF PET scanners.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 3(*b*) illustrates a 3D view of this cylindrical 3D PET scanner.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
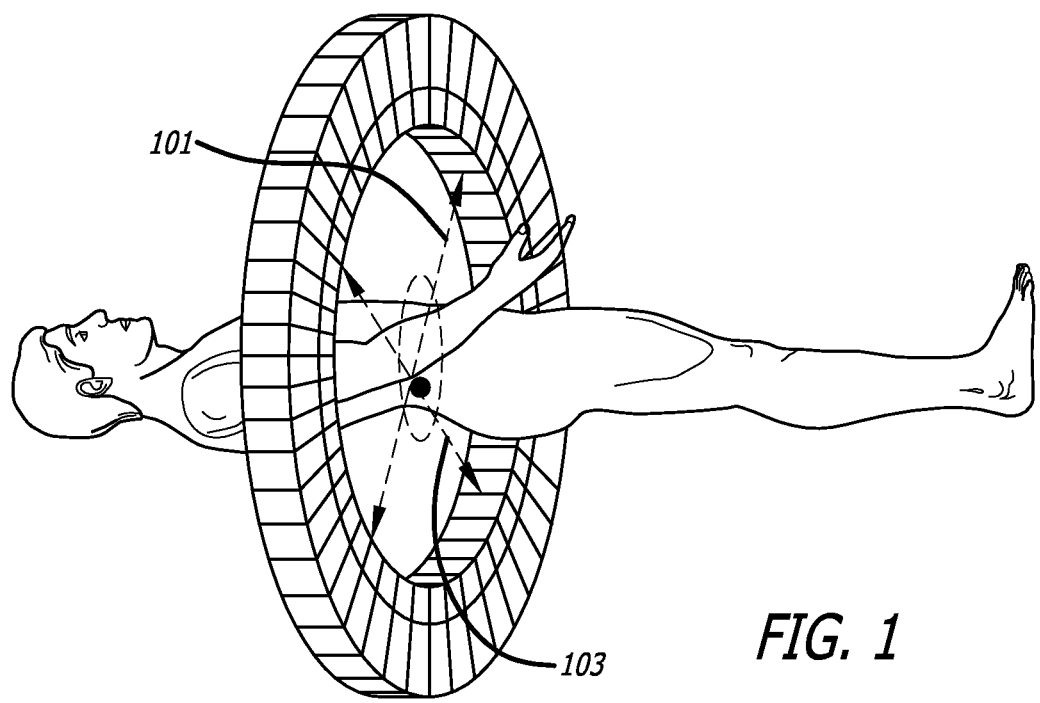
FIG. 1 illustrates a prior art 2D detector array for PET.
Figure 2:
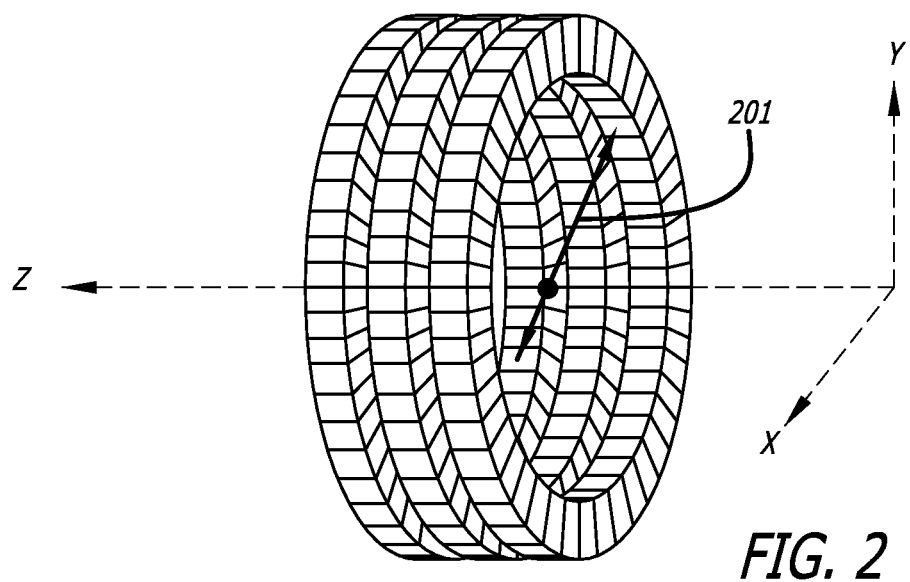
FIG. 2 illustrates a prior art 3D detector array for PET.
Figure 3A:
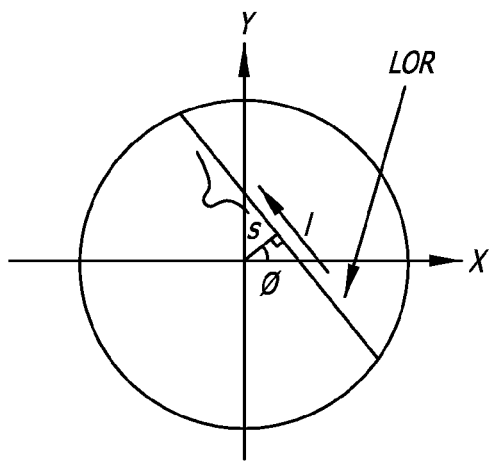
FIG. 3(*a*) illustrates a transverse view of a cylindrical 3D PET scanner.
Figure 3B:
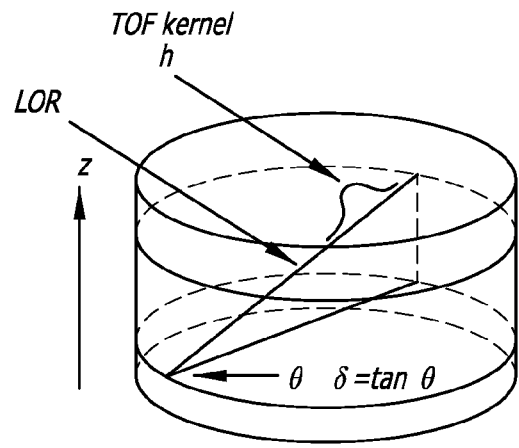

3D TOF PET data p from a cylindrical scanner may be modeled as a line integral weighted by a TOF kernel h, which model the uncertainty in TOF measurements:

$$p(s, \phi, z, \delta; t) = \sqrt{1+\delta^2} \int_{-\infty}^{\infty} f(s\cos\phi - l\sin\phi, s\sin\phi + l\cos\phi, z + l\delta) h(t - l\sqrt{1+\delta^2}) dl \quad (1)$$

where f denotes a 3D object, s and $\phi$ are the radial and angular coordinates, respectively, z is the axial midpoint of each line of response (LOR), $\delta$ is the tangent of the oblique angle $\theta$ and t is the TOF variable representing the difference in arrival time of the two detected photons in coincidence. Many of these variables are illustrated in FIG. 3. For each line of response (LOR), the object may be multiplied by the TOF kernel and integrated along the line to form the TOF data.

The TOF kernel may be assumed to be shift invariant so that the integral in equation (1) may be written in the form of a convolution. If h=1, then p in equation (1) may represent non-TOF data. When $\delta=0$, p may represent stacked 2D sinograms which may be referred to as simply 2D data.

Fourier Transform of TOF Data with Respect to TOF Variable

By taking the Fourier transform in equation (1) with respect to the "TOF variable" t as well as s and z, the following equation, which represents the generalized projection slice theorem for 3D TOF PET data, may be derived in a cylindrical scanner geometry, see Cho S., Ahn S., Li Q., and Leahy R. M. (2008), "*Analytical Properties of Time-of-Flight PET Data*," Phys. Med. Biol., vol. 53, pp. 2890-2821:

$$\wp(\omega_s, \phi, \omega_z, \delta; 107_t) = \sqrt{1+\delta^2} H(\omega_t) F(\omega_s \cos\phi - \chi \sin\phi, \omega_s \sin\phi + \chi \cos\phi, \omega_z) \quad (2)$$

where F and H are the Fourier transforms of f and h, respectively; $\wp$ is the Fourier transform of $p(s,\phi,z,\delta;t)$ with respect to s, z and t; $\omega_s$, $\omega_z$ and $\omega_t$ are the frequency variables corresponding to s, z and t, and $$\chi = \omega_t \sqrt{1+\delta^2} - \delta\omega_z. \quad (3)$$

The case $\omega_t=0$ may correspond to the DC component in the TOF variable direction, which may be the sum through the TOF bin variable t, and therefore may represent non-TOF data. The Fourier transform with respect to the "TOF variable" t may have the effect of taking the TOF kernel term H out of the integrals and may produce a direct mapping between the object space (F) and the data space ($\wp$) in (2).

Figure 4:
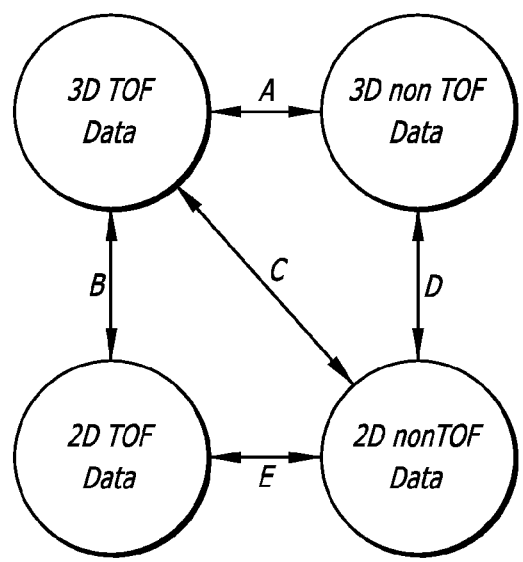
FIG. 4 shows mappings between data spaces that may be derived from a generalized projection theorem.

As a consequence of the relationship in equation (2), there may be a great deal of redundancy in TOF PET data. Ultimately, the purpose of a PET scanner may be to reconstruct the image f whose Fourier transform F is included on the right hand side of (2). Since this is a 3 dimensional function but the left hand side of (2) is a 5 dimensional function, there may be multiple different subsets of the function $\wp$ from which the image f may be uniquely recovered. Fourier rebinning methods may correspond to selecting and equating the different subsets of this function $\wp$ that correspond to the following special cases: a 3D non-TOF PET case (when $\omega_t=0$), a 2D TOF case (when $\delta=0$) and a 2D non-TOF case (when $\omega_t=0$ and $\delta=0$). Selecting and equating these subsets may result in mappings between different representations of the PET data as shown in FIG. 4. These mappings may then be used to compute the rebinned PET data.

Mappings Between Data Spaces

The generalized projection slice theorem in equation (2) may enable exact mappings between various data sets to be found, such as 3D/2D and TOF/non-TOF data, as reflected in FIG. 4. In each case, rebinning may be performed by computing the Fourier transform of the 3D TOF data, applying the coordinate transformations from Table 1, or approximations of these transformations, and computing a weighted average of the resulting Fourier transformed data with respect to the redundant variables, and then computing the inverse Fourier transform to produce the rebinned data. For example, a mapping between 3D TOF data and 3D non TOF data may be obtained as follows. First, by setting $\omega_t$ to zero, this may result in:

$$\wp(\omega_s,\phi,\omega_z,\delta;0) = \sqrt{1+\delta^2} H(0) F(\omega_s \cos\phi + \delta\omega_z \sin\phi, \omega_s \sin\phi - \delta\omega_z \cos\phi, \omega_z) \quad (4)$$

for 3D non-TOF data. Equating the right-hand sides of equation (2) for 3D TOF data and equation (4) for 3D non-TOF data, may yield the following result:

$$\wp(\omega_s, \phi, \omega_z, \delta; \omega_t) = \frac{H(\omega_t)}{H(0)} \wp(\omega'_s, \phi', \omega_z, \delta; 0) \quad (5)$$

subject to the following relationships:

$$\omega_s \cos\phi - \chi \sin\phi = \omega'_s \cos\phi' + \delta\omega_z \sin\phi'$$

$$\omega_s \sin\phi + \chi \cos\phi = \omega'_s \sin\phi' - \delta\omega_z \cos\phi'. \quad (6)$$

By solving equation (6) for $\omega'_t$ and $\phi'$, an exact inverse rebinning mapping from 3D non-TOF data to 3D TOF data may be obtained:

$$\omega'_s = \omega_s \sqrt{1 + \frac{\chi^2 - (\delta\omega_z)^2}{\omega_s^2}} \quad (7)$$

$$\phi' = \phi + \arctan\left(\frac{\chi}{\omega_s}\right) + \arctan\left(\frac{\delta\omega_z}{\omega'_s}\right).$$

In a similar manner, each of the other mappings listed in TABLE 1 may be derived using the generalized projection slice theorem in equation (2). Mapping D may be equivalent to exact inverse Fourier rebinning, see Defrise M., Kinahan P. E., Townsend D. W., Michel C., Sibomana M., and Newport D. F. (1997), "*Exact and Approximate REbinning Algorithms for 3-D PET data;*" IEEE Trans. Med. Imaging, vol. 16, pp. 145-158, and the exact Fourier rebinning equation Liu X., Defrise M., Michel C., Sibomana M., Comtat C., Kinahan P., and Townsend D. (1999), "*Exact Rebinning Methods for Three-Dimensional PET,*" IEEE Trans. Med. Imaging, vol. 18, pp. 657-664. that maps between 2D non TOF data and 3D non TOF data. The mappings A,B,C and E may all be invertible so that they may be employed to map from higher to lower dimensional data (a procedure called rebinning) or to compute the inverse mapping from lower to higher dimensional data (a procedure called inverse rebinning).

TABLE 1

Exact Rebinning Mappings

| Mapping | Involved data sets | Mapping equations |
|---|---|---|
| A | 3D TOF data $\wp(\omega_s, \phi, \omega_z, \delta; \omega_t)$ | $\omega_s\cos\phi - \chi\sin\phi = \omega'_s\cos\phi' + \delta\omega_z\sin\phi'$ |
|  | 3D non-TOF data $\wp(\omega'_s, \phi', \omega_z, \delta; 0)$ | $\omega_s\sin\phi + \chi\cos\phi = \omega'_s\sin\phi' - \delta\omega_z\cos\phi'$ |
| B | 3D TOF data $\wp(\omega_s, \phi, \omega_z, \delta; \omega_t)$ | $\omega_s\cos\phi - \chi\sin\phi = \omega'_s\cos\phi' - \omega_t\sin\phi'$ |
|  | 2D TOF data $\wp(\omega'_s, \phi', \omega_z, 0; \omega_t)$ | $\omega_s\sin\phi + \chi\cos\phi = \omega'_s\sin\phi' + \omega_t\cos\phi'$ |
| C | 3D TOF data $\wp(\omega_s, \phi, \omega_z, \delta; \omega_t)$ | $\omega_s\cos\phi - \chi\sin\phi = \omega'_s\cos\phi'$ |
|  | 2D non-TOF data $\wp(\omega'_s, \phi', \omega_z, 0; 0)$ | $\omega_s\sin\phi + \chi\cos\phi = \omega'_s\sin\phi'$ |
| D | 3D non-TOF data $\wp(\omega_s, \phi, \omega_z, \delta; 0)$ | $\omega_s\cos\phi + \delta\omega_z\sin\phi = \omega'_s\cos\phi'$ |
|  | 2D non-TOF data $\wp(\omega'_s, \phi', \omega_z, 0; 0)$ | $\omega_s\sin\phi - \delta\omega_z\cos\phi = \omega'_s\sin\phi'$ |
| E | 2D TOF data $\wp(\omega_s, \phi, \omega_z, 0; \omega_t)$ | $\omega_s\cos\phi - \omega_t\sin\phi = \omega'_s\cos\phi'$ |
|  | 2D non-TOF data $\wp(\omega'_s, \phi', \omega_z, 0; 0)$ | $\omega_s\sin\phi + \omega_t\cos\phi = \omega'_s\sin\phi'$ |

REBINNING 3D TOF PET DATA TO 2D TOF PET DATA

Mappings between 3D TOF data and 2D TOF data (mapping B in TABLE 1 and FIG. 4) may be derived from the generalized projection slice theorem in equation (2) as $$\wp(\omega'_s, \phi', \omega'_z, 0; \omega_t) = \frac{1}{\sqrt{1+\delta^2}} \wp(\omega_s, \phi, \omega_z, \delta; \omega_t) \quad (8)$$

where $$\omega_s = \omega'_s \sqrt{1 + \frac{\omega_t^2 - (\chi')^2}{(\omega'_s)^2}} \quad (9)$$

$$\phi = \phi' + \arctan\left(\frac{\omega_t}{\omega'_s}\right) - \arctan\left(\frac{\chi'}{\omega_s}\right)$$

with $\chi' = \omega_t \sqrt{1+\delta^2} - \delta\omega'_z$. Summing the TOF Fourier transform data in equation (8) with respect to the oblique angle variable $\delta$ using the relationships in equation (9) and computing the inverse Fourier transform of the result produces the rebinned 2D TOF data.

Mapping E is a 2D version of mapping B, that is a mapping between 2D TOF and 2D non-TOF data formats.

To implement the above exact rebinning mapping, inverse rebinning may be performed to estimate the missing oblique TOF sinograms that are required to compute the Fourier transform in z. For example, the following inverse rebinning mapping (mapping C) may be used:

$$\wp(\omega_s, \phi, \omega_z, \delta; \omega_t) = \sqrt{1+\delta^2} \frac{H(\omega_t)}{H(0)} \wp(\omega_s', \phi', \omega_z, 0; 0) \qquad (10)$$

where $$\omega_s' = \omega_s \sqrt{1 + \left(\frac{\chi}{\omega_s}\right)^2} \qquad (11)$$

$$\phi' = \phi + \arctan\left(\frac{\chi}{\omega_s}\right).$$

A normalization step may be required to account for the variable contribution to each frequency bin in 2D TOF data $\wp(\omega_s', \phi', \omega_z, 0; \omega_t)$ from the oblique sinogram in 3D TOF data $\wp(\omega_s, \phi, \omega_z, \delta; \omega_t)$. See Liu X., Defrise M., Michel C., Sibomana M., Comtat C., Kinahan P., and Townsend D. (1999), "*Exact Rebinning Methods for Three-Dimensional PET*," IEEE Trans. Med. Imaging, vol. 18, pp. 657-664. After the 3D TOF sinogram is rebinned to stacked 2D direct TOF sinograms, any 2D TOF image reconstruction method may be applied to each 2D direct TOF sinogram.

Exact and Approximate Rebinning TOG PET Data to Non-TOF PET Data

The exact mapping between 3D TOF data and 2D non-TOF data, that is, mapping C in TABLE 1, may be given by:

$$\omega_s' = \omega_s \sqrt{1 + \left(\frac{\chi}{\omega_s}\right)^2} \qquad (12)$$

$$\phi' = \phi + \arctan\left(\frac{\chi}{\omega_s}\right).$$

The exact mapping equations (12) may require a Fourier transform in the axial variable z. However, the oblique data may be axially truncated due to the finite axial aperture of the scanner. To address the missing data problem, approximate mapping equations may be applied as follows.

A first-order Taylor series truncation may be used with respect to $\chi/\omega_s$:

$$\omega_s' \approx \omega_s, \qquad (13)$$

$$\phi' \approx \phi + \frac{\chi}{\omega_s}.$$

This approximation may lead to the following approximate inverse rebinning equation:

$$\wp(\omega_s, \phi, \omega_z, \delta; \omega_t) \approx \frac{H(\omega_t)}{H(0)} \wp\left(\omega_s, \phi + \frac{\omega_t\sqrt{1+\delta^2} - \delta\omega_z}{\omega_s}, \omega_z, 0; 0\right). \qquad (14)$$

By taking the Fourier transform in φ and then taking the inverse Fourier transform in $\omega_z$ and using the shift property of Fourier transforms, the equations above may be rewritten as:

$$\tilde{P}(\omega_s, k, z, \delta; \omega_t) \approx \qquad (15)$$

$$\sqrt{1+\delta^2} \frac{H(\omega_t)}{H(0)} \exp\left(ik\frac{\omega_t\sqrt{1+\delta^2}}{\omega_s}\right) \tilde{P}\left(\omega_s, k, z - \frac{\delta k}{\omega_s}, 0; 0\right)$$

Where k represents the frequency variable with respect to the trans-axial angular coordinate φ and $\tilde{P}$ is the 3D Fourier transform of p(s,φ,z,δ;t) in s, φ and t. The approximate mapping does not require a Fourier transform in the z direction. Similarly, an approximate rebinning equation may be written as $$\tilde{P}(\omega_s, k, z, 0; 0) \approx \qquad (16)$$

$$\frac{1}{\sqrt{1+\delta^2}} \frac{H(0)}{H(\omega_t)} \exp\left(-ik\frac{\omega_t\sqrt{1+\delta^2}}{\omega_s}\right) \tilde{P}\left(\omega_s, k, z + \frac{\delta k}{\omega_s}, \delta; \omega_t\right),$$

Equation (16) may be used as the basis for rebinning of 3D TOF data to 2D non-TOF data without a Fourier transform with respect to z using the following weighted average with respect to δ and $\omega_t$:

$$\tilde{P}_{2D}^{non-TOF}(\omega_s, k, z) = \sum_{\delta, \omega_t} \beta_{\omega_s, k, z, \delta, \omega_t} \tilde{P}'(\omega_s, k, z, \delta; \omega_t) \qquad (16.5)$$

Where β are a set of weights that may be chosen to maximize the signal to noise ratio in the rebinned data. The rebinned 2DPET data without TOF information is computed by taking the inverse 2D Fourier transform of the left hand side of equation (16.5) with respect to the frequency variables $\omega_s$ and k.

The exact mapping in TABLE 1 that rebins 3D TOF data to 3D non-TOF data is given by $$\omega_s' = \omega_s \sqrt{1 + \frac{\chi^2 - (\delta\omega_z)^2}{\omega_s^2}} \qquad (17)$$

$$\phi' = \phi + \arctan\left(\frac{\omega_t\sqrt{1+\delta^2} - \delta\omega_z}{\omega_s}\right) + \arctan\left(\frac{\delta\omega_z}{\omega_s'}\right).$$

To address the missing data problem by removing the dependence on $\omega_z$, the following approximation may be made:

$$\omega_s' \approx \omega_s \sqrt{1 + \left(\frac{\omega_t\sqrt{1+\delta^2}}{\omega_s}\right)^2} \qquad (18)$$

$$\phi' \approx \phi + \arctan\left(\frac{\omega_t\sqrt{1+\delta^2}}{\omega_s}\right),$$

which may be seen as the zeroth-order Taylor series truncation with respect to $\delta\omega_z/\omega_s$. This approximation yields the following approximate inverse rebinning equation:

$$P(\omega_s, \phi, z, \delta; \omega_t) \approx \qquad (19)$$

$$\frac{H(\omega_t)}{H(0)} P\left(\omega_s\sqrt{1 + \frac{\omega_t^2(1+\delta^2)}{\omega_s^2}}, \phi + \arctan\left(\frac{\omega_t\sqrt{1+\delta^2}}{\omega_s}\right), z, \delta; 0\right)$$

where P is the 2D Fourier transform of p(s,φ,z,δ;t) in s and t. The corresponding approximate rebinning equation may be written as $$P(\omega_s, \phi, z, \delta; 0) \approx \qquad (20)$$

$$\frac{H(0)}{H(\omega_t)} P\left(\omega_s\sqrt{1 - \frac{\omega_t^2(1+\delta^2)}{\omega_s^2}}, \phi - \arctan\left(\frac{\omega_t\sqrt{1+\delta^2}}{\omega_s'}\right), z, \delta; \omega_t\right)$$

where $\omega_s' = \omega_s\sqrt{1-\omega_t^2(1+\delta^2)/\omega_s^2}$. Equation (20) may be used as the basic for rebinning of 3D TOF data to 3D non-TOF data without a Fourier transform with respect to z using the following weighted average with respect to $\omega_t$:

$$P_{3D}^{non-TOF}(\omega_s, \phi, z, \delta) = \sum_{\omega_t} \alpha_{\omega_s,\phi,z,\delta,\omega_t} P'(\omega_s, \phi, z, \delta; \omega_t) \quad (21)$$

where α are a set of weights that may be chosen to maximize the signal to noise ratio in the rebinned data and $P'(\omega_s,\phi,z,\delta;\omega_t)$ represents the function on the left hand side in (20) for each $\omega_t$. The rebinned 3D PET data without TOF information is computed by taking the inverse 1D Fourier transform of the right hand side of equation (21) with respect to the frequency variable $\omega_s$.

The exact mappings A,B,C and E shown in FIG. 4 may be made, along with their approximations, and the associated mathematical descriptions given above and in Cho S., Ahn S., Li Q., and Leahy R. M. (2008), "Analytical Properties of Time-of-Flight PET Data," Phys. Med. Biol., vol. 53, pp. 2890-2821; Cho S., Ahn S., Li Q., and Leahy R. M. (2009), "Exact and Approximate Fourier Rebinning of PET Data from Time-of-Flight to Non Time-of-Flight," Phys. Med. Biol., vol. 54, pp. 467-484. This process may be applied to data collected from TOF PET scanners designed for biomedical research and clinical use. These scanners may detect individual positron-electron annihilation events and record the geometrical coordinates that define the line of response joining the detector pair as well as other salient information including but not limited to the time of flight (differential arrival time of the photon pair), the time of event detection relative to the time of administration of the radiotracer to the patient/subject, the energy collected in the two detectors, and other information such as physiological data including respiratory and cardiac information for use in gated studies and motion compensation. The scanner may also collect the usual calibration information, including but not limited to singles and random rates, and transmission data from x-ray or gamma ray sources for use in attenuation correction. Calibration studies using known sources may be used to acquire information necessary for quantification. These methods may be applicable to the current generation of TOF scanners employing a combination of crystal scintillators and photomultiplier tubes for detection of gamma rays produced by photon/electron annihilation. They may also be applicable to current and future scanners that will employ other means of photon detection including solid state detectors.

After application of the rebinning methods described above, 2D and 3D PET images may be reconstructed using many possible methods. These include existing Fourier transform based methods including filtered back-projection, Fourier space interpolation, and their variants. They may also be used in conjunction with iterative or model based methods, including but not limited to expectation maximization (EM), ordered subsets EM (OSEM), penalized maximum likelihood, maximum a posteriori and other methods. The inverse rebinning methods may be used to generate estimates of missing data and also as part of a forward and back projection pair as part of an iterative 3D reconstruction method. Realization of the methods which have been described may be achieved using C or C++ code or other programming language and used on single central processing unit (CPU) computer, multiple-core or multiple CPU computers, and/or computer clusters. Specialized computation hardware may be used, including programmable systems incorporating specialized processing units such as the GPU (general processing unit) and digital signal processor chips. Other implementations may include field programmable gate array and other partially or fully dedicated computational units.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

The computer programming instructions which have been described may be contained on computer-readable storage media, such as one or more DVDs, CDs, flash memories, magnetic tapes, hard disk drives, RAMs, ROMs, PROMS, and/or ePROMS.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A medical imaging system for reconstructing a nuclear medicine image comprising:
   a three dimensional positron emission tomography (3D PET) scanner configured to generate 3D time of flight (TOF) PET scan data, the 3D TOF PET scan data representing a total number of photons arriving between each detector pair in the 3D PET scanner parameterized by variables that describe the spatial coordinates of lines of response, the spatial coordinates for each line of response including a transaxial radial coordinate, a transaxial angular coordinate, a tangent of an oblique angle between the line of response and a transaxial plane, an axial coordinate, and time of flight (TOF) information indicative of differences in arrival times of the photons at the detectors pairs;
   a computer processing system programmed with one or more algorithms configured to:
      rebin the 3D TOF PET scan data into a lower dimensional format having only a subset of the variables that does not include a variable representing time-of-flight information by:
         taking the Fourier transform of the 3D TOF PET scan data with respect to at least one of the variables that describe the spatial coordinates and the variable that describes the TOF information;
applying a coordinate transformation to the Fourier transformed 3D TOF PET data to match coordinates of the Fourier transform representation of the rebinned data;
computing an average of the coordinate transformed data with respect to one or more variables that are not used to represent the rebinned data; and
computing an inverse Fourier transform of the averaged data;
reconstruct the image from the rebinned data; and
store the reconstructed image in a data storage system or display the reconstructed image on a display system.

2. The medical imaging system of claim 1 wherein the one or more algorithms are configured to take the Fourier transform with respect to the TOF and other variables so as to result in rebinning the 3D TOF PET scan data into a 3D PET scan data format without TOF information.

3. The medical imaging system of claim 2 wherein the one or more algorithms are configured to:
take the Fourier transform of the 3D TOF PET scan data with respect to the transaxial radial coordinate and the time of flight variable;
use truncated Taylor series approximations of the transaxial angular coordinate and the transaxial radial coordinate to compute the coordinate transformation of the Fourier transformed 3D TOF PET scan data; and
compute a weighted average of the coordinate transformed data with respect to a variable representing the frequency of the Fourier transform with respect to the TOF flight variable.

4. The medical imaging system of claim 1 wherein the one or more algorithms are configured to take the Fourier transform with respect to the TOF and other variables in a way that results in rebinning the 3D TOF PET scan data to a 2D PET scan data format without TOF information.

5. The medical imaging system of claim 4 wherein the one or more algorithms are configured to:
take the Fourier transform of the 3D TOF PET scan data with respect to the transaxial radial coordinate, the transaxial angular coordinate, and the time of flight variable;
use a truncated Taylor series approximations of the transaxial angular coordinate and the transaxial radial coordinate to compute the coordinate transformation of the Fourier transformed 3D TOF PET data;
compute a weighted average of the coordinate transformed data with respect to the variable representing the tangent of the oblique angle between the line of response and the transaxial plane and a variable representing the frequency of the Fourier transform with respect to the TOF flight variable.

6. A medical imaging system for reconstructing a nuclear medicine image comprising:
a three dimensional positron emission tomography (3D PET) scanner configured to generate 3D time of flight (TOF) PET scan data, the 3D TOF PET scan data representing a total number of photons arriving between each detector pair in the 3D PET scanner parameterized by variables that describe the spatial coordinates of lines of response, the spatial coordinates for each line of response including a transaxial radial coordinate, a transaxial angular coordinate, a tangent of an oblique angle between the line of response and a transaxial plane, an axial coordinate, and time of flight (TOF) information indicative of differences in arrival times of the photons at the detectors pairs; and a computer processing system programmed with an iterative algorithm configured to:
generate a reconstructed PET image by performing a forward projection operation to compute the 3D TOF PET data from a first image, the forward projection operation including computing 2D non-TOF, or 3D non-TOF PET scan data from the first image and inverse rebinning to compute 3D TOF PET data from the computed 2D non TOF or 3D non TOF formats; and
repeating the preceding generate step multiple times with the reconstructed PET image that was last generated being substituted for the first image; and
store the last reconstructed image in a data storage system or display the last reconstructed image on a display system.

7. A computer processing system for calculating three dimensional time of flight positron emission tomography (3D TOF PET) scan data, the computer processing system being programmed with one or more algorithms configured to:
receive measured or computer generated two-dimensional (2D) non-TOF PET scan data or 3D non TOF PET scan data from a computer system or a PET scanner parameterized by variables that describe spatial coordinates of lines of response;
compute the 3D TOF PET scan data by inverse rebinning of the Fourier transformed 2D non-TOF or 3D non-TOF PET scan data by:
taking the Fourier transform of the 2D non-TOF or 3D non-TOF PET scan data with respect to at least one of the variables that describe the spatial coordinates;
applying a coordinate transformation to the Fourier transformed data to match coordinates of the Fourier transform representation of the 3D TOF PET scan data with respect to at least one of the variables that describe the spatial coordinates and the variable that describes the TOF information;
computing the Fourier transform of the 3D TOF PET data from the coordinate transformed data; and
computing an inverse Fourier transform of the Fourier transform of the 3D TOF PET scan data.

8. Computer-readable storage media containing computer-readable programming instructions which, when loaded into a computer system which is part of a medical imaging system which also has a three dimensional positron emission tomography (3D PET) scanner configured to generate 3D time of flight (TOF) PET scan data, the 3D TOF PET scan data representing a total number of photons arriving between each detector pair in the 3D PET scanner parameterized by variables that describe the spatial coordinates of lines of response, the spatial coordinates for each line of response including a transaxial radial coordinate, a transaxial angular coordinate, a tangent of an oblique angle between the line of response and a transaxial plane, an axial coordinate, and time of flight (TOF) information indicative of differences in arrival times of the photons at the detectors pairs, cause the computer system to:
rebin the 3D TOF PET scan data into a lower dimensional format having only a subset of the variables that does not include a variable representing time-of-flight information by:
taking the Fourier transform of the 3D TOF PET scan data with respect to at least one of the variables that describe the spatial coordinates and the variable that describes the TOF information;

applying a coordinate transformation to the Fourier transformed 3D TOF PET data to match coordinates of the Fourier transform representation of the rebinned data;

computing an average of the coordinate transformed data with respect to one or more variables that are not used to represent the rebinned data; and computing an inverse Fourier transform of the averaged data;

reconstruct the image from the rebinned data; and store the reconstructed image in a data storage system or display the reconstructed image on a display system.

9. Computer-readable storage media containing computer-readable programming instructions which, when loaded into a computer system which is part of a medical imaging system for reconstructing a nuclear medicine image which also includes a three dimensional positron emission tomography (3D PET) scanner configured to generate 3D time of flight (TOF) PET scan data, the 3D TOF PET scan data representing a total number of photons arriving between each detector pair in the 3D PET scanner parameterized by variables that describe the spatial coordinates of lines of response, the spatial coordinates for each line of response including a transaxial radial coordinate, a transaxial angular coordinate, a tangent of an oblique angle between the line of response and a transaxial plane, an axial coordinate, and time of flight (TOF) information indicative of differences in arrival times of the photons at the detectors pairs, cause the computer system to implement an iterative algorithm which:

generates a reconstructed PET image, by performing a forward projection operation to compute the 3D TOF PET data from a first image, the forward projection operation including computing 2D non-TOF or 3D non-TOF PET scan data from the first image and inverse rebinning to compute 3D TOF PET data from the computed 2D non TOF or 3D non TOF formats;

repeats the preceding generate step multiple times with the reconstructed PET image that was last generated being substituted for the first image; and stores the last reconstructed image in a data storage system or display the last reconstructed image on a display system.

10. Computer-readable storage media containing computer-readable programming instructions which, when loaded into a computer system for calculating three dimensional time of flight positron emission tomography (3D TOF PET) scan data, causes the computer system to:

receive measured or computer generated two-dimensional (2D) non-TOF PET scan data or 3D non TOF PET scan data from a computer system or a PET scanner parameterized by variables that describe spatial coordinates of lines of response; and compute 3D TOF PET scan data by inverse rebinning of the Fourier transformed 2D non-TOF, or 3D non-TOF PET scan data by:

taking the Fourier transform of the 2D non-TOF or 3D non-TOF PET scan data with respect to at least one of the variables that describe the spatial coordinates;

applying a coordinate transformation to the Fourier transformed data to match coordinates of the Fourier transform representation of the 3D TOF PET scan data with respect to at least one of the variables that describe the spatial coordinates and the variable that describes the TOF information;

computing the Fourier transform of the 3D TOF PET data from the coordinate transformed data; and computing an inverse Fourier transform of the Fourier transform of the 3D TOF PET scan data.

* * * * *